United States Patent
Contreras et al.

(10) Patent No.: US 8,049,984 B2
(45) Date of Patent: Nov. 1, 2011

(54) INTEGRATED SLIDER BIAS CONTROL

(75) Inventors: John Contreras, Palo Alto, CA (US);
Luiz Franca-Neto, Sunnyvale, CA (US);
Bernhard Knigge, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 266 days.

(21) Appl. No.: 12/328,483

(22) Filed: Dec. 4, 2008

(65) Prior Publication Data
US 2010/0142096 A1 Jun. 10, 2010

(51) Int. Cl.
G11B 5/03 (2006.01)
G11B 5/48 (2006.01)
G11B 21/16 (2006.01)

(52) U.S. Cl. ............................ 360/66; 360/245.8

(58) Field of Classification Search .................. None
See application file for complete search history.

(56) References Cited

U.S. PATENT DOCUMENTS

| | | | | |
|---|---|---|---|---|
| 6,473,258 | B1* | 10/2002 | Shitara et al. | 360/67 |
| 7,450,333 | B2* | 11/2008 | Hirano et al. | 360/75 |
| 2008/0080096 | A1* | 4/2008 | Miura | 360/245.8 |

* cited by examiner

Primary Examiner — Daniell L Negron

(57) ABSTRACT

In a method of biasing a slider, a bias voltage is generated for biasing a slider. The bias voltage is integratedly coupled to a conductive body of the slider via an existing signal path of the slider such that the slider is biased with the bias voltage. The existing signal path is primarily used for conveying another signal to or from the slider but at least sometimes conveys the bias voltage to the conductive body in an integral fashion along with another signal.

15 Claims, 10 Drawing Sheets

```
                        900
┌─────────────────────────────────────────────────────────┐
│ CONTROL GENERATION OF A BIAS VOLTAGE WITH A PREDETERMINED│
│          PROGRAMMABLE BIAS VOLTAGE VALUE.               │
│                         905                             │
└─────────────────────────────────────────────────────────┘
                          │
                          ▼
┌─────────────────────────────────────────────────────────┐
│              GENERATE THE BIAS VOLTAGE.                 │
│                         910                             │
└─────────────────────────────────────────────────────────┘
                          │
                          ▼
┌─────────────────────────────────────────────────────────┐
│ INTEGRATEDLY COUPLE THE BIAS VOLTAGE TO A CONDUCTIVE BODY OF │
│ A SLIDER VIA AN EXISTING SIGNAL PATH OF THE SLIDER SUCH THAT THE │
│   SLIDER IS BIASED WITH THE BIAS VOLTAGE, WHEREIN THE EXISTING │
│   SIGNAL PATH IS PRIMARILY USED FOR CONVEYING ANOTHER SIGNAL TO │
│   OR FROM THE SLIDER BUT AT LEAST SOMETIMES CONVEYS THE BIAS │
│   VOLTAGE TO THE CONDUCTIVE BODY IN AN INTEGRAL FASHION ALONG │
│                  WITH THE ANOTHER SIGNAL.               │
│                         920                             │
└─────────────────────────────────────────────────────────┘
```

FIG. 9

INTEGRATED SLIDER BIAS CONTROL

BACKGROUND

Hard disk drives are used in almost all computer system operations. In fact, most computing systems are not operational without some type of hard disk drive to store the most basic computing information such as the boot operation, the operating system, the applications, and the like.

Over the years, the disk and the head have undergone great reductions in their size. Much of the refinement has been driven by consumer demand for smaller and more portable hard drives such as those used in personal digital assistants (PDAs), Moving Picture Experts Group (MPEG) video and audio players, and the like. For example, the original hard disk drive had a disk diameter of 24 inches. Modern hard disk drives are much smaller and include disk diameters of 3.5 inches or less. Advances in magnetic recording storage densities are also primary reasons for the reduction in size.

Modern drives have very narrow tolerances for components and operation of components. Disk drive sliders are designed to fly in very close proximity to the disk surface. For instance, in some systems the slider may be designed to fly only three to five nanometers above the disk surface. In a system with such close tolerances, components can be subject to van der Waals, Meniscus, electrostaic, spindle motor charge up, and contact potential forces. These forces are due to a variety of causes, such as: the molecular attraction of components in very close proximity; adhesive friction caused by contact between the slider and the lubricant on the disk; the build up of electrical potential between the disk and the slider caused by the rotating disk surface (tribo-charging); the build up of electrical potential in motor bearings (tribo-charging); potential difference (e.g., contact potential difference in work functions) that exists between two different metals (different Fermi levels of slider and disk material); and impacts between the slider and disk surface.

BRIEF DESCRIPTION OF THE DRAWINGS

The accompanying drawings, which are incorporated in and form a part of this specification, illustrate some embodiments of the present invention and, together with the description of embodiments, serve to explain principles discussed below.

FIG. 9 shows a flow diagram of an example method of biasing a slider, according to one embodiment.

Figure 1:
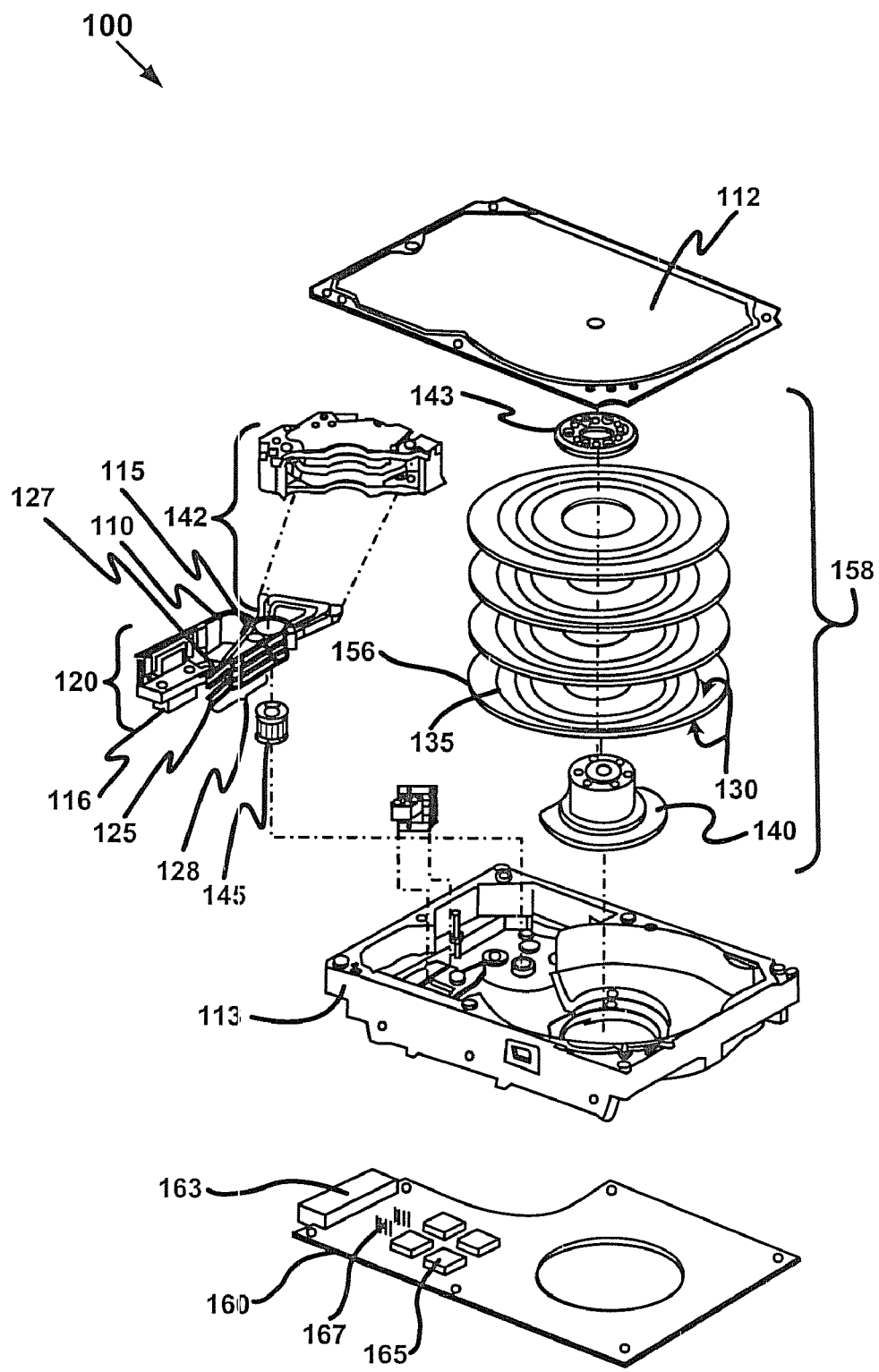
FIG. 1 is an isometric blow-up view of an HDD, in accordance with one embodiment.

The drawings referred to in this Brief Description should be understood as not being drawn to scale unless specifically noted.

DESCRIPTION OF EMBODIMENTS

Reference will now be made in detail to several embodiments of the present invention, examples of which are illustrated in the accompanying drawings. While the embodiments of subject matter discussed herein will be described in conjunction with various embodiments, it will be understood that they are not intended to limit the embodiments of the subject matter to these embodiments. On the contrary, the presented embodiments are intended to cover alternatives, modifications and equivalents, which may be included within the spirit and scope of the various embodiments as defined by the appended claims. Furthermore, in the following Description of Embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure or limit aspects of the described embodiments.

Overview of Discussion

Computers have become part of every day life, and as such, expectations and demands continually increase for greater speed for manipulating data, for storing larger amounts of data, for more compact, and for consuming less energy. To meet these demands for increased performance, the electro-mechanical storage assembly in a computer, specifically the Hard Disk Drive (HDD) has undergone many changes so that more data can be stored in smaller spaces and so that data can be stored and retrieved more quickly and efficiently. One aspect of these changes includes a reduction in the flying height of the head of a slider over the surface of a disk.

Read and write elements or transducers, often referred to as "heads," reside in the slider of an HDD. As flying heights diminish, it becomes more relevant to accurately control the head-disk distance (e.g., the distance between the read-write heads and the disk). Two items that can negatively affect the fly-height of the slider are lubricant-slider interaction, such as lube pickup, and electrostatic force. The negative effects of both of these items can be diminished and/or eliminated by controlling the slider's voltage potential with respect to the disk's potential. Therefore, controlling the slider's voltage reduces slider wear and allows for lower flying-heights. This voltage-controlled slider can also be a component of other architecture features such as: flying height modulation, active damping, pre-contact detection, fly-height measurement and control, disk defect mapping, and RF injection for spacing feedback. Additionally, sliders often suffer from RFI (radio frequency interference problems) in association with head-disk distance.

Embodiments described herein relate how existing signal paths on a slider can be employed to perform their existing functions such as conveying a heater element signal, read data, write data, and the like, while also being used in an integral fashion to couple a bias voltage to the body of the slider, and, in some embodiments to control or attenuate a frequency range of RFI signals. As sliders have become very small, there is often little or no physical space on the slider to add additional signal paths. The embodiments described herein provide for slider biasing and additionally, in some embodiments RFI interference immunity or attenuation, by utilizing existing signal paths and without adding an additional signal path or additional signal paths on the already crowded real estate of the slider electrical-attachment region. Slider/HDI biasing can have many beneficial uses, including, but not limited to: lube pickup control; slider wear/burnish rate control; lowered flying height modulation when used in conjunction with lower magnetic spacing with active damping; increased flying height modulation when used in conjunction with pre-contact detection with active excitation; assistance with clearance/fly-height measurement and control; assistance with disk defect mapping (contact potential map of disk); and assistance with injection of Radio Frequency/microwave signals to the head disk interface for use in head disk interface spacing feedback.

The discussion will begin with a brief overview of a hard disk drive (HDD) which comprises an integrated slider bias control system for biasing a slider in an integral fashion over existing signal paths of the slider. Several example embodiments of biasing a slider in this integral fashion will be described. The illustrated embodiments depict slider biasing in the integral fashion using a bias voltage generated by a read-write integrated circuit and coupled to the body of the slider via a variety of existing slider signal paths. These example embodiments also depict several example slider designs configured for receiving the biasing voltage over existing signal paths. Some of the example embodiments of biasing a slider in this integral fashion also illustrate slider designs which attenuate RFI interference on the slider. Operation of the example slider bias control system will then be described in more detail in conjunction with the description of an example method of biasing a slider.

Example Hard Disk Drive

Figure 2:
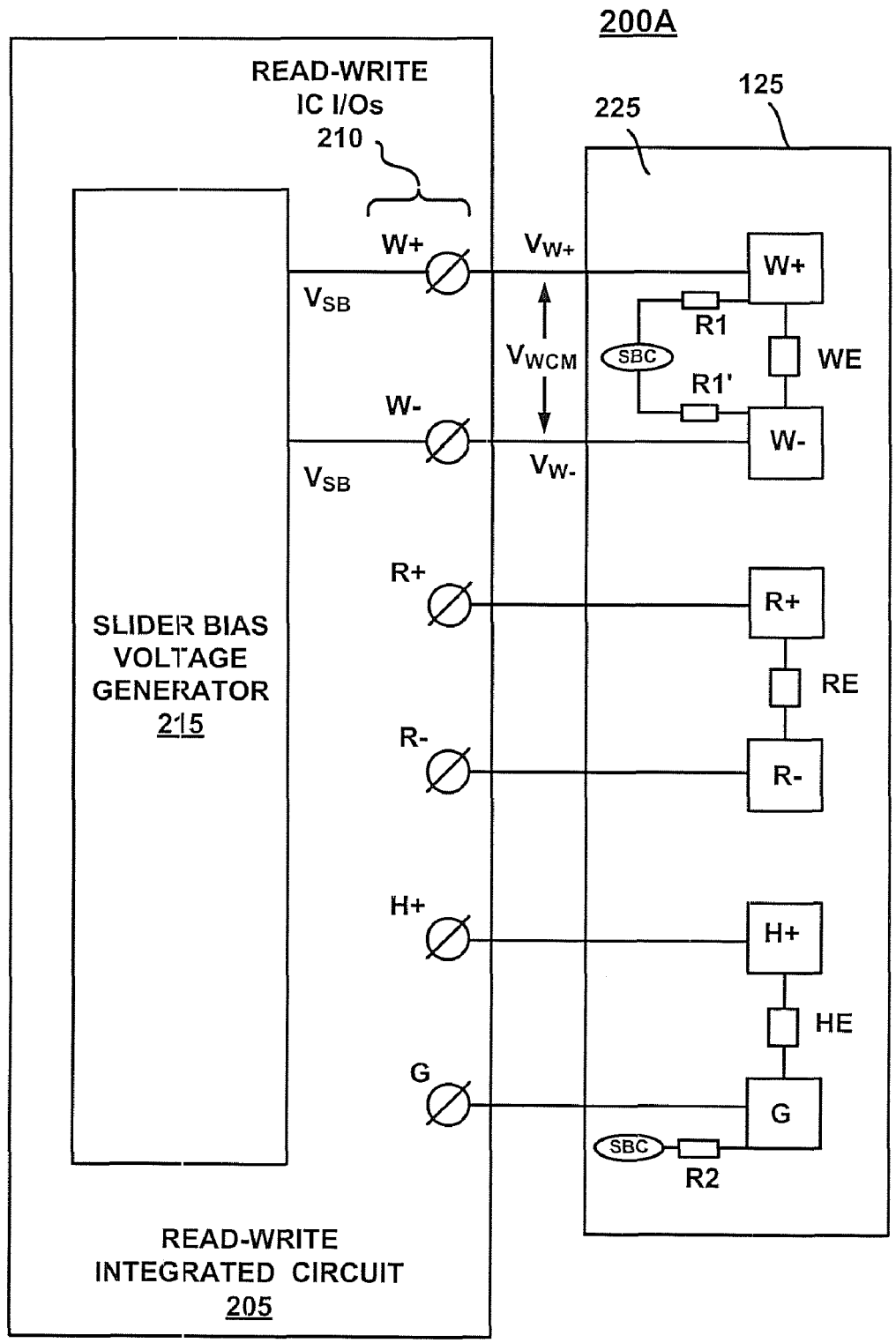
FIG. 2 is block diagram of an example integrated slider bias control system, in accordance with one embodiment.

With reference to FIG. 1, an isometric blow-up view of an example hard disk drive, HDD 100, is presented in accordance with an embodiment of the present invention. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135. HSA 120, at times referred to as an actuator assembly or carriage, comprises suspension 127, which suspends hard disk drive slider 125 next to disk surface 130, and HSA connector 116. In one embodiment, suspension 127 is an integrated lead suspension (ILS). Hard disk drive slider 125 includes one or more magnetic transducers or heads which read data from and write data to data tracks 135. Suspension 127 and hard disk drive slider 125 comprise the head gimbal assembly (HGA) 128. Flex cable 110, which is part of HSA 120, conveys data between HSA connector 116 and arm electronics (AE) module 115. AE module 115 controls read and write operations and, as described herein, in various embodiments includes a read-write integrated circuit (IC) 205 (FIG. 2). Read-write IC 205 is coupled to slider 125 via flex cable 110 and suspension 127. In some embodiments, read-write IC 205 is located elsewhere within HDD 100, such as on flex cable 110, within other portions of HSA 120, or on printed circuit board (PCB) 160. HSA connector 116 also conveys control data between PCB 160 and VCM 142.

HSA 120 is coupled pivotally with base casting 113 by means of pivot bearing 145, such that VCM 142 can move HGA 128 with slider 125 accurately and arcuately across disk surface 130, accessing data tracks 135. Upon assembly of HSA 120, disk stack 158, VCM 142, and other components with base casting 113, cover 112 is coupled with base casting 113 to enclose these components and sub-assemblies into HDD 100.

The cover 112 is coupled with base casting 113, and PCB 160 is coupled to base casting 113. PCB 160 comprises electrical components 165 which in general perform the electrical signal processing for HDD 100, such as status checks for HDD 100, power control for motor-hub assembly 140, servo control of VCM 142, and other tasks related to reading data from and writing data to the disk media. The VCM 142 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160. It is appreciated that PCB 160 and/or electrical component 165 can be configured in other physical manners and other locations, in other embodiments.

The displayed configuration of HDD 100 is shown by way of example and not of limitation. It is also appreciated that in some embodiments, one or more components of HDD 100 can be interchanged or shared between subassemblies while maintaining the spirit of the definitions of the aforementioned assemblies and subassemblies.

Example Integrated Slider Bias Control System

FIGS. 2-7 are block diagrams of example integrated slider bias control systems (200A-200F), in accordance with various embodiments. Common to these example systems are slider 125 which has a conductive body 225; a slider bias voltage generator 215 which generates a direct current (DC) bias voltage; and an integrated signal path comprised of an existing signal path on a slider (e.g. slider 125). Although slider bias voltage generator 215 is shown as a portion of read-write integrated circuit (IC) 205, in some embodiments, slider bias voltage generator 215 is located in other portions of a hard disk drive, such as HDD 100. For example, in one embodiment, slider bias voltage generator 215 is included as a portion of PCB 160 for a common slider bias control. In each of FIGS. 2, 3, 4, 5, 6A, and 6B one or more of slider 125, slider bias voltage generator 215, an RFI attenuation path, and/or the integrated signal path is configured in a slightly different fashion. In various embodiments, the systems illustrated in FIGS. 2-7 are included in a hard disk drive, such as HDD 100.

By "existing signal path," what is meant is that a traditionally existing signal path, such as a read path, write path, and/or heater element control path is/are utilized for coupling the bias voltage to slider body 225. While an existing signal path may be slightly modified, such as through the inclusion of components such as a capacitor, a coupling to a slider body connection, and/or a resistor, a separate special purpose signal path for coupling the slider bias voltage from slider bias voltage generator 215 to slider body 225 is not utilized. By "integrated" what is meant is that the existing signal path is primarily used for conveying another signal (e.g., a read data signal, write data signal, or heater element control signal) between the slider and some entity external to the slider. However, at least sometimes, the other signal and a slider bias voltage are conveyed simultaneously, integrated together with one another, on the same signal path within the slider. Thus, this existing signal path may convey the bias voltage to conductive body 225 in an "integral fashion" along with the other signal (e.g., a read data signal, write data signal, or heater element control signal) that is being conveyed to or from the slider on the same signal path. Several examples are illustrated herein and discussed further below.

In FIGS. 2-7, slider 125 comprises a conductive body 225 and includes a write element (WE), read element (RE), and heater element (HE). It is appreciated that RE and WE may be referred to as a read head and write head, respectively; referred to as a "transducer" or "head;" or collectively as "heads." As depicted, a signal path exists between read-write IC 205 and the write element, WE, of slider 125. Additionally, another signal path also exists between read-write IC 205 and the read element, RE, of slider 125.

Read-write IC 205 includes a plurality of read-write IC input/outputs 210. In one embodiment, read-write IC input/outputs 210 comprise pads (for electrical connectivity) which are coupled via signal paths to slider 125. Read-write IC input/outputs 210 include: write+ (W+), write− (W−), read+ (R+), read− (R−); heater element control+ (H+), and ground (G). In other embodiments, read-write IC input/outputs 210 may include additional/different inputs and/or outputs and the return for heater element may be floating to change the ground (G) to return line, H−.

FIG. 2 is a block diagram of an example integrated slider bias control system 200A, in accordance with one embodiment. Slider bias voltage generator 215 is shown as part of read-write IC 205. Slider bias voltage generator 215 generates a controllable slider bias voltage, $V_{SB}$, which is a direct current (DC) voltage. In one embodiment, the function of slider bias voltage generator 215 is performed by and incorporated in the write driver of read-write IC 205. In addition to the slider bias voltage, $V_{SB}$, generated by slider bias voltage generator 215, read-write IC 205 generates and receives numerous signals which are coupled between input/outputs 210 of read-write IC 205 and slider 125.

In the embodiment of FIG. 2, slider 125 includes resistive components $R_1$ and $R_{1'}$, which are coupled between a slider body connection, SBC, and each leg of the signal path between write element, WE, and read-write IC 205. This provides a common mode signal path which couples $V_{SB}$ to slider body 225. Additionally, a third resistive element $R_2$ couples the slider body connection, SBC, to the ground line, G, of heater element, HE. With this connection scheme, the write driver's common-mode voltage $V_{WCM}$ is equivalent to $0.5\ (V_{W-}+V_{W+})$ and can be used to control the potential of slider body 225 with respect to the ground of a HDD system, such as HDD 100 and disk 156 (FIG. 1). With proper resistance matching between $R_1$ and $R_{1'}$, the bias or potential of slider body 225 is expressed as shown in Equation 1:

$$V_{SB} = \frac{V_{WCM} R_2}{\frac{R_1}{2} + R_2} \quad \text{EQUATION 1}$$

As evident from Equation 1, for resistance values where $R_1 \ll R_2$, the $V_{WCM}$ voltage is equivalent to the $V_{SB}$ voltage. Thus, in some embodiments $R_1$ and $R_{1'}$ are selected to be substantially equivalent (or matched) and also to be very small in comparison to $R_2$. In one embodiment, for example, $R_1$ is selected to be approximately 550Ω or greater with $R_2$ selected to be much larger than $R_1$. For example, in one embodiment $R_2$ is selected to be a factor of ten times larger than the value of $R_1$. When $R_1$ and $R_2$ are selected in this manner, $R_2$ comprises a low frequency high impedance path to ground and $V_{SB}$ is substantially equivalent to $V_{WCM}$.

It is appreciated that write signals and $V_{SB}$ are sometimes both conveyed simultaneously, in an integral fashion, over the existing write signal path between read-write IC 205 and write element, WE, of slider 125. Thus, while the primary purpose of the write signal path between read-write IC 205 and WE of slider 125 is conveying write data signals, this existing signal path is also used, in one embodiment for coupling the slider bias voltage $V_{SB}$ to slider body 225 from read-write IC 205. As such, while writing is taking place, write signals and $V_{SB}$ may be conveyed simultaneously over the write signal path. When writing is not taking place, $V_{SB}$ may be conveyed alone, as the only signal on the write signal path.

Figure 3:
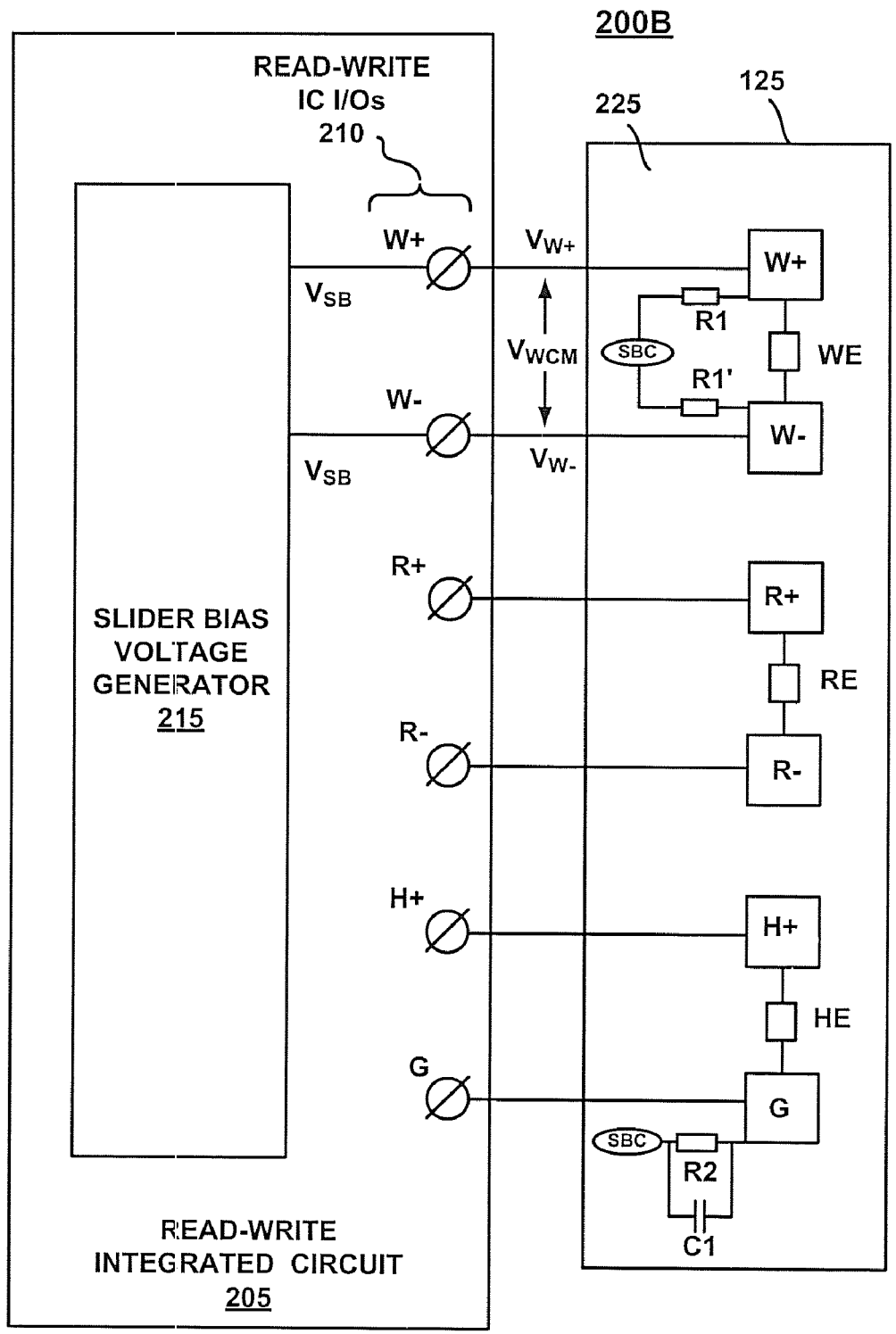
FIG. 3 is a block diagram of an example integrated slider bias control system with RFI attenuation, in accordance with one embodiment.

FIG. 3 is a block diagram of an example integrated slider bias control system 200B with Radio Frequency Interference (RFI) attenuation, in accordance with one embodiment. In FIG. 3, like elements are the same as those shown in FIG. 2. With RFI signals present the environment of a hard disk drive, the slider body 225 can easily transfer these RFI signals to the read element, RE, of slider 125. This could damage the read element or interfere with read data signals. As such, slider 125 is configured with a shunting capacitor $C_1$ across resistive element $R_2$. Capacitor $C_1$ shunts RFI signals from slider body 225 through $C_1$ to the ground line, G, thus reducing or attenuating the RFI signals and simultaneously reducing or attenuating the coupling of RFI signals to read element, RE. This provides RFI suspension of high frequency signals which have been coupled into slider body 225. Equation 2 expresses how the value of capacitor $C_1$ is selected for the desired or appropriate cutoff frequency, $f_c$, for shunting RFI signals.

$$C_1 = \frac{1}{2\pi R_2 f_c} \quad \text{EQUATION 2}$$

With reference to Equation 1, in one embodiment, a capacitance value of 1 pF, along with an appropriate value of $R_2$, can be chosen as the value of $C_1$ to attenuate RFI signals of 50 Mhz and higher. In one embodiment, a value of $C_1$ is chosen such that RFI signals of 100 Mhz and higher are coupled to ground, G, through $C_1$.

Figure 4:
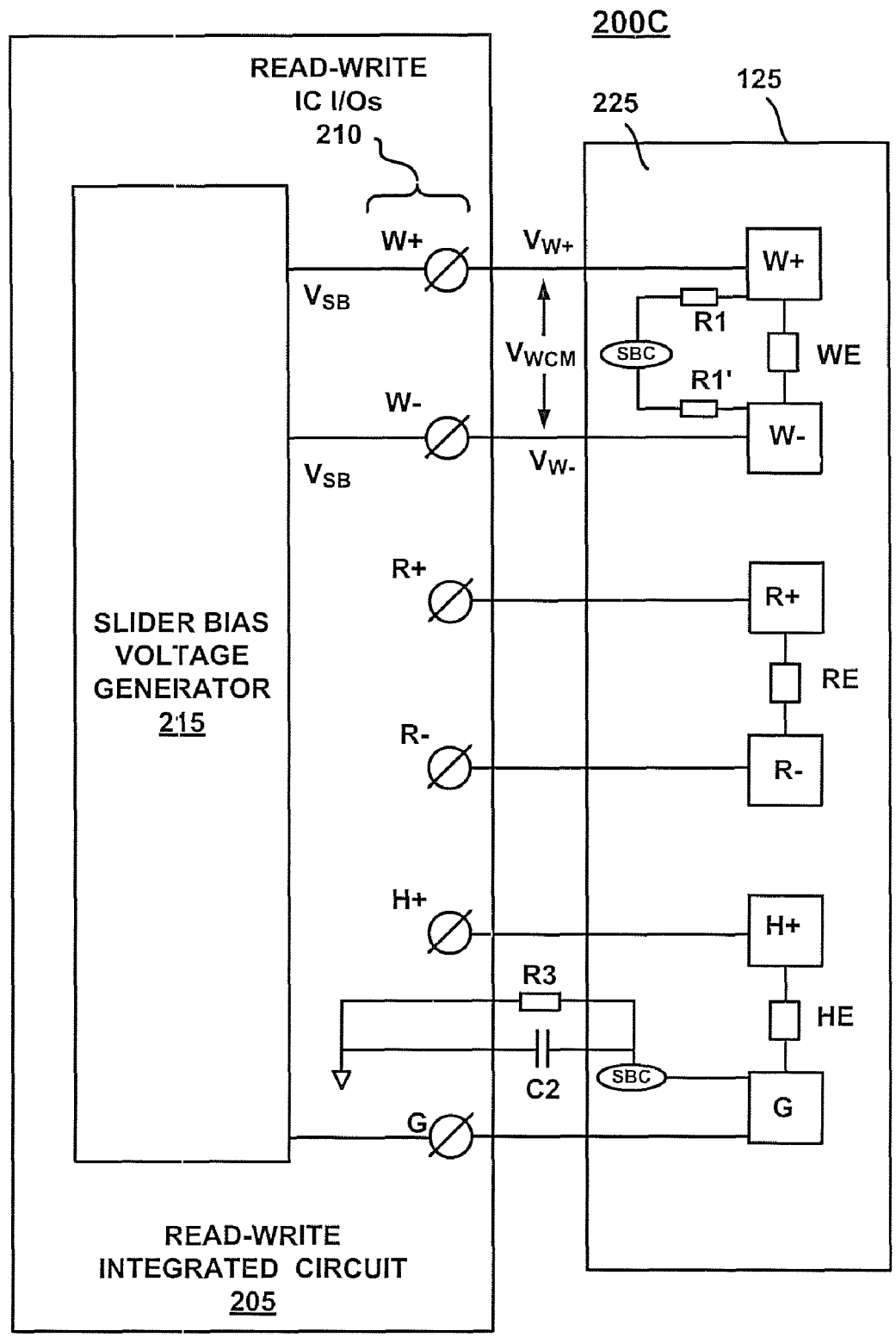
FIG. 4 is a block diagram of an example integrated slider bias control system with RFI attenuation utilizing an alternate ground connection, in accordance with one embodiment.

FIG. 4 is a block diagram of an additional example integrated slider bias control system 200C with Radio Frequency Interference (RFI) attenuation, in accordance with one embodiment. FIG. 4 shows an alternative ground connection the through the slider body created by a slider body connection or a conductive path through the slider body itself. The connection's electrical characteristics are similar to the ground connection shown in FIG. 3, but this ground connection does not utilize the heater path, which then does not require any connections to the heater ground line, G. As such, slider 125 has shunting capacitor $C_2$ across resistive element $R_3$. Capacitor $C_2$ shunts RFI signals from slider body 225 through $C_2$ to the ground connection of the ILS 127 and read-write IC 205, and thus reducing or attenuating the RFI signals coupled to read element, RE. The $C_2$ connection provides a shunting path for the RFI signals which have been coupled into slider body 225. In one embodiment, the values of $R_3$ and $C_2$ may be designed as integrated components in the slider body as described for $R_2$ and $C_1$. In one embodiment, the values of $R_3$ and $C_2$ may be created by using a low-conductive epoxy connection to the slider body.

Figure 5:
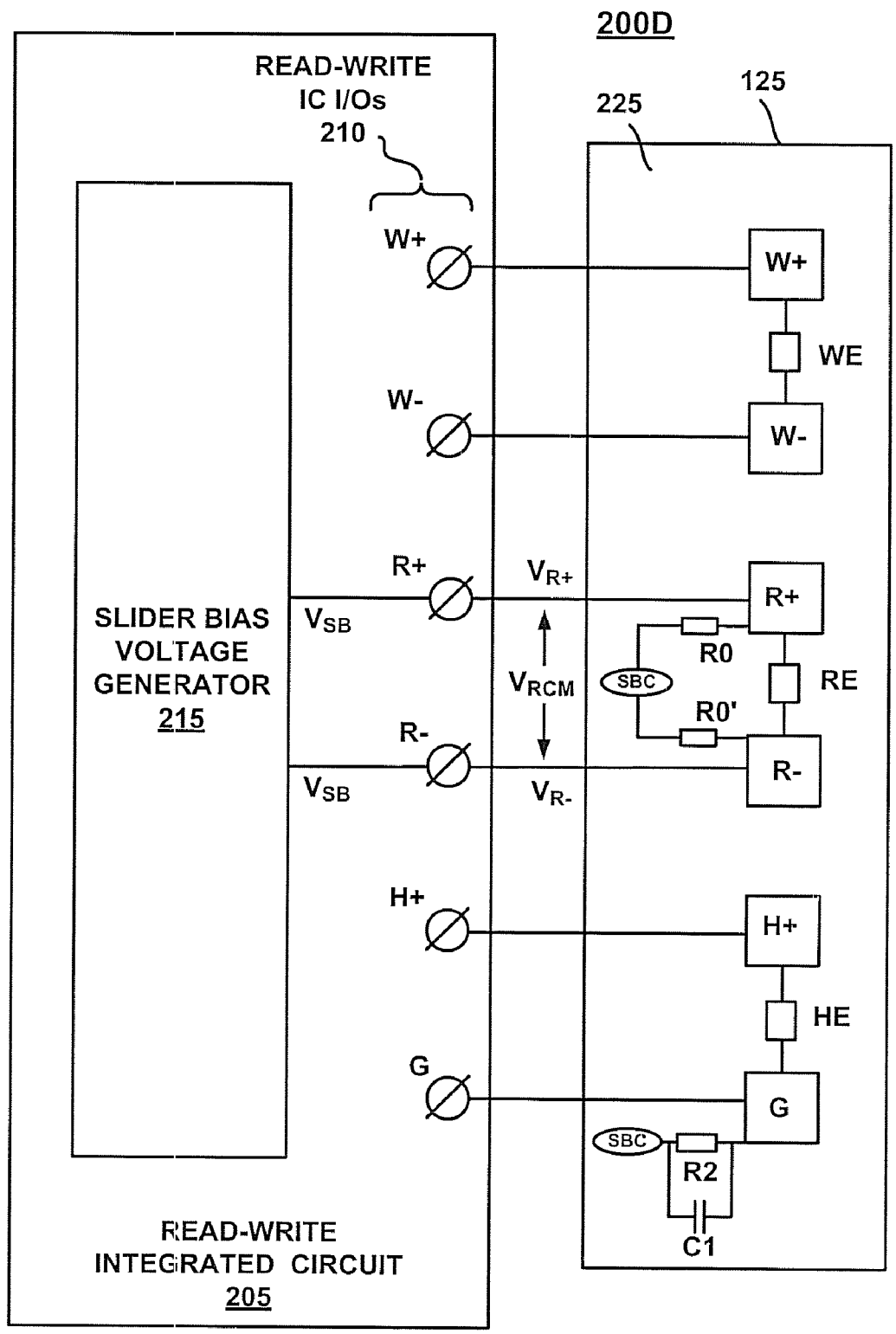
FIG. 5 is a block diagram of an example integrated slider bias control system with RFI attenuation, in accordance with one embodiment.

FIG. 5 is a block diagram of an example integrated slider bias control system 200D with RFI attenuation, in accordance with one embodiment. In FIG. 5, like elements are the same as those shown in FIG. 2 and FIG. 3. Slider bias voltage generator 215 is shown as part of read-write IC 205. Slider bias voltage generator 215 generates a controllable slider bias voltage, $V_{SB}$, which is a direct current (DC) voltage. In addition to the slider bias voltage, $V_{SB}$, generated by slider bias voltage generator 215, read-write IC 205 generates and receives numerous signals which are coupled between input/outputs 210 of read-write IC 205 and slider 125.

In the embodiment of FIG. 5, slider 125 includes resistive components $R_0$ and $R_{0'}$ which are coupled between a slider body connection, SBC, and each leg of the path between read element, RE, and read-write IC 205. This connection provides a common mode signal path which couples $V_{SB}$ to slider body 225. Additionally, a third resistive element $R_2$ couples the slider body connection, SBC, to the ground line, G, of heater element, HE. With this connection scheme, the read amplifier's common-mode voltage $V_{RCM}$ is equivalent to 0.5 $(V_{R-}+V_{R+})$ and can be used to control the potential of slider body 225 with respect to the potential of the disk, such as disk 156 (FIG. 1). With proper resistance matching between $R_0$ and $R_0'$, the bias or potential of slider body 225 is expressed as shown in Equation 1, where the value $R_1$ is replaced with the value of $R_0$.

As evident from Equation 1, for resistance values where $R_0 \ll R_2$, the $V_{RCM}$ voltage is equivalent to the $V_{SB}$ voltage. Thus, in some embodiments $R_0$ and $R_0$ are selected to be substantially equivalent (or matched) and also to be very small in comparison to $R_2$. In one embodiment, for example, $R_0$ is selected to be approximately 2000Ω or greater with $R_2$ selected to be much larger than $R_0$, such as 20 kΩ or greater. For example, in one embodiment $R_2$ is selected to be a factor of ten times larger than the value of $R_0$. When $R_0$ and $R_2$ are selected in this manner, $R_2$ comprises a low frequency high impedance path to ground and $V_{SB}$ is substantially equivalent to $V_{RCM}$.

It is appreciated that read signals and $V_{SB}$ are sometimes both conveyed simultaneously, in an integral fashion, over the existing read signal path between read-write IC 205 and read element, RE, of slider 125. Thus, while the primary purpose of the read signal path between read-write IC 205 and RE of slider 125 is conveying read signals, this existing signal path is also used, in one embodiment for coupling the slider bias voltage $V_{SB}$ to slider body 225 from read-write IC 205. As such, while reading is taking place, read signals and $V_{SB}$ may be conveyed simultaneously over the read signal path. When reading is not taking place, $V_{SB}$ may be conveyed alone, as the only signal on the read signal path.

Capacitor $C_1$, across resistive element $R_2$, is included in one embodiment of slider 125. When included, $C_1$ shunts RFI signals to slider body 225 through the ground line, G. This reduces or attenuates the RFI signals and simultaneously reduces or attenuates the coupling of RFI signals to read element, RE. Selection of a value for $C_1$ is performed in the same manner as has been previously described in conjunction with FIG. 3 and Equation 2. In an embodiment, such as where RFI attenuation is not needed or desired, capacitor $C_1$ can be omitted.

Figure 6A:
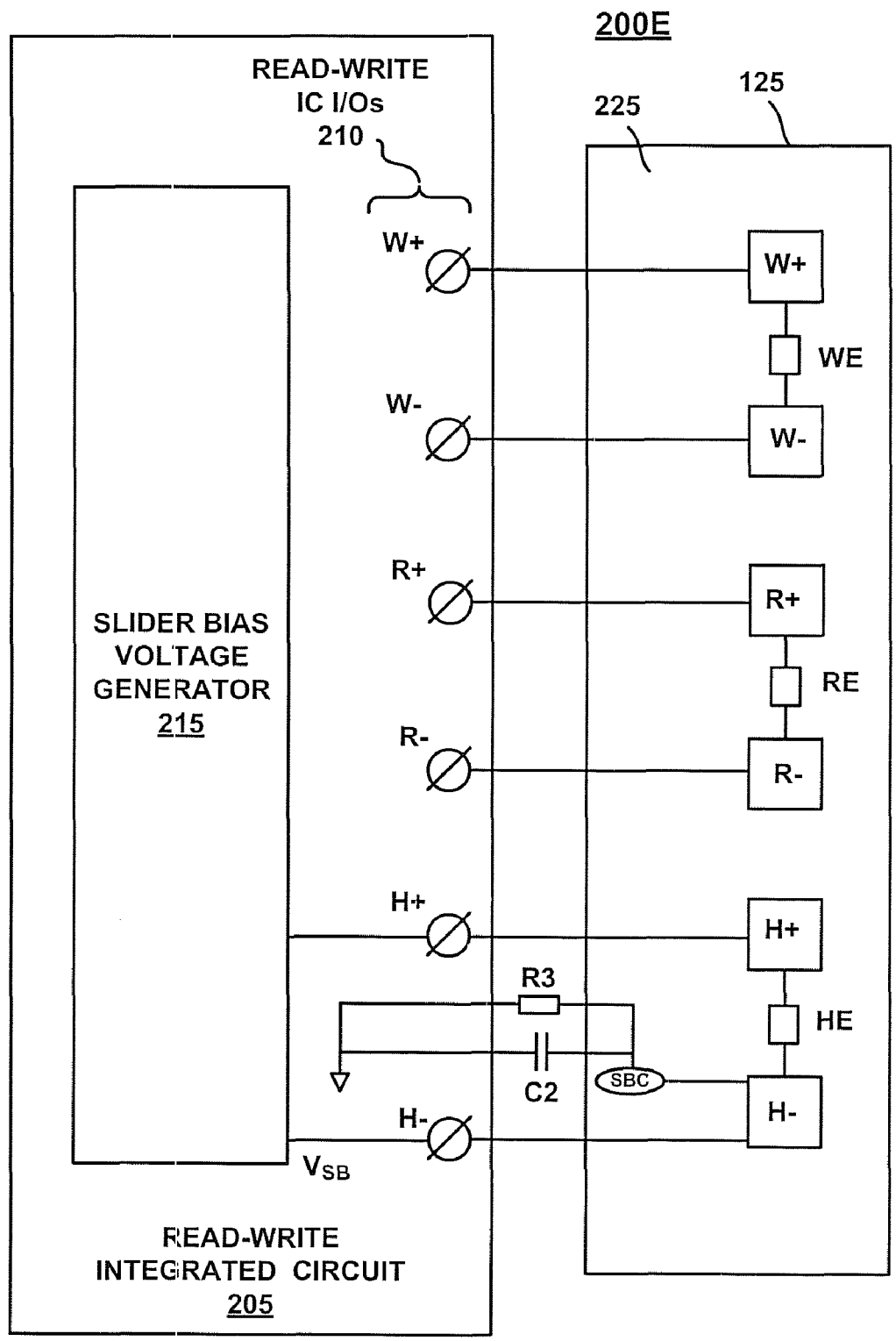
FIG. 6A is a block diagram of an example integrated slider bias control system with RFI attenuation, in accordance with one embodiment.

FIG. 6A is a block diagram of an example integrated slider bias control system 200E, in accordance with one embodiment. In FIG. 6A, like elements are the same as those shown in FIG. 4. Slider bias voltage generator 215 is shown as part of read-write IC 205. Slider bias voltage generator 215 generates a controllable slider bias voltage, $V_{SB}$, which is a direct current (DC) voltage. In addition to the slider bias voltage, $V_{SB}$, generated by slider bias voltage generator 215, read-write IC 205 generates and receives numerous signals which are coupled between input/outputs 210 of read-write IC 205 and slider 125.

In the embodiment of FIG. 6A, slider 125 includes a coupling between heater element return, H−, and slider body connection, SBC. Additionally, as shown in FIG. 6A, the slider bias voltage, $V_{SB}$, is coupled from read-write IC 205 via the heater element, H+, output of read-write IC 205 over the heater element signal line H+, through the heater element, HE, to signal return line H−, and then to slider body connection, SBC. This provides a slider bias path, H−, which couples $V_{SB}$ to slider body 225.

It is appreciated that heater element control voltages and $V_{SB}$ are sometimes both conveyed simultaneously, in an integral fashion, over the existing signal path between read-write IC 205 and heater element, HE, of slider 125. Thus, while the primary purpose of the heater element signal path between read-write IC 205 and HE of slider 125 is conveying heater element signals/voltages, this existing signal path is also used, in one embodiment for coupling the slider bias voltage $V_{SB}$ to slider body 225 from read-write IC 205.

Figure 6B:
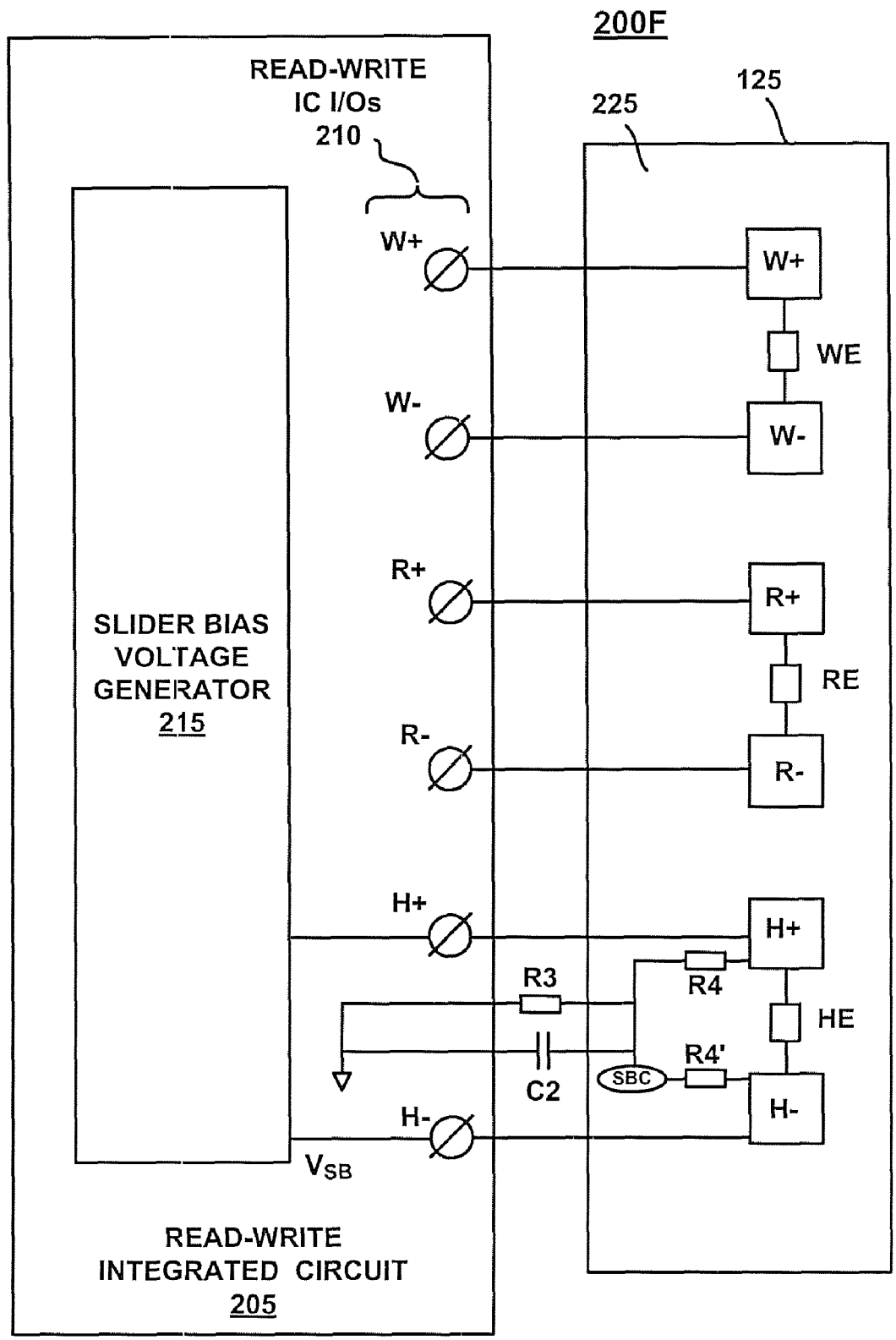
FIG. 6B is a block diagram of an example integrated slider bias control system with RFI attenuation, in accordance with one embodiment.

FIG. 6B is a block diagram of an example integrated slider bias control system 200F with RFI attenuation, in accordance with one embodiment. System 200F of FIG. 6B is similar to system 200E of FIG. 6A except that system 200F illustrates one example of a variation on the RFI attenuation, where H+ is coupled to slider body connection, SBC, via $R_4$ and H− is coupled to SBC via $R_{4'}$. In one embodiment, $R_4$ and $R_{4'}$ are matched resistors with substantially the same resistance as one another.

Figure 7:
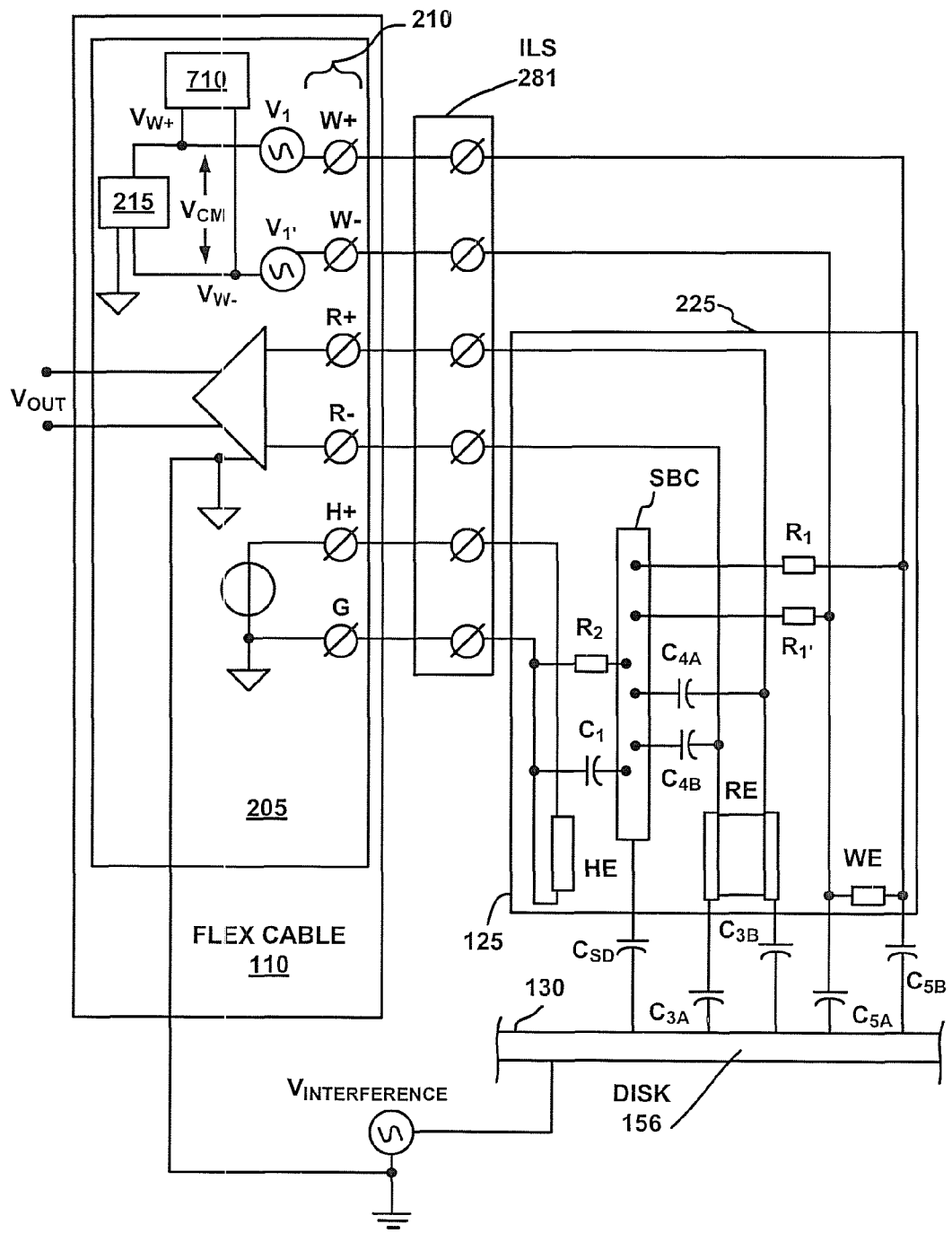
FIG. 7 is a block diagram of an example integrated slider bias control system with RFI attenuation with illustrated interference paths, in accordance with one embodiment.

FIG. 7 is a block diagram of an example integrated slider bias control system with RFI attenuation with illustrated interference paths, in accordance with one embodiment. The integrated slider bias control system of FIG. 7 is the same as system 200A of FIG. 2, except with more detail illustrated and with couplings to a flex cable and a disk illustrated. As such, like elements of FIG. 7 are the same as those previously described in FIG. 1 and FIG. 2. FIG. 7 illustrates interference paths in slider 125 and also illustrates the internal workings of one embodiment of read-write IC 205 in a greater level of detail than shown in FIG. 2.

In FIG. 7, $C_1$ is a high frequency shunt capacitor; $C_{SD}$ represents a capacitance which exists between slider 125 and the surface 130 of disk 156; $C_{3A}$ and $C_{3B}$ represent capacitances which exist between shielding of read element, RE, and disk 156; $C_{4A}$ and $C_{4B}$ represent capacitances which exist between slider 125 and shielding of read element, RE; $C_{5A}$ and $C_{5B}$ represent capacitances that exist between points of the write element, WE, and surface 130 of disk 156. In FIG. 7, $R_1$ and $R_{1'}$ are resistive elements in line with each respective leg of the common mode write connection in slider 125; and $R_2$ is a resistive element between conductive slider body 225 and ground. $R_1$, $R_{1'}$, and $R_2$ comprise the resistive elements which are created, in one embodiment, through a deposition process. In one embodiment, $C_1$ is created by building up the read or write element with plates that will have vias to connect and shut across $R_2$.

In FIG. 7, the interference paths of the front-end system of one embodiment of HDD 100 are shown, where the interference signal (in the form of RFI) is represented as signal source $V_{INTERFERENCE}$. The primary path of the interference signal is through the slider-to-disk capacitance $C_{SD}$, because of the value of $C_{SD}$ in comparison to other capacitance values in the vicinity. Without capacitor $C_1$, interference would travel through the read element coupling capacitors, $C_{4A}$ and $C_{4B}$. Shunt capacitance $C_1$ shunts interference away from the low-level signal generated by the read element, RE, by allowing the interference signal to be directed to the heater element, HE, ground connection, G.

For the design of write driver 710 there is an additional circuit block added, in the form of slider bias voltage generator 215, to control the common-mode voltage of the output of the write driver. In this manner, slider bias voltage generator 215 controls the common-mode voltage supplied on the write lines between read-write IC 205 and slider 125. Whether write driver 710 is in an active or inactive state, the common mode control block in the form of slider bias voltage generator 215, applies an equal bias offset to both output lines (W+ and W−). The bias offset, in one embodiment, is designed to limit the current output, for contact asperities, either by using series resistance with a common-voltage source, or by using a controlled current source with limited bandwidth. With a common mode control source, the common-mode voltage supplied on the output of write driver 710 is sensed and controlled whether write driver 710 is in an active or an inactive state.

Figure 8:
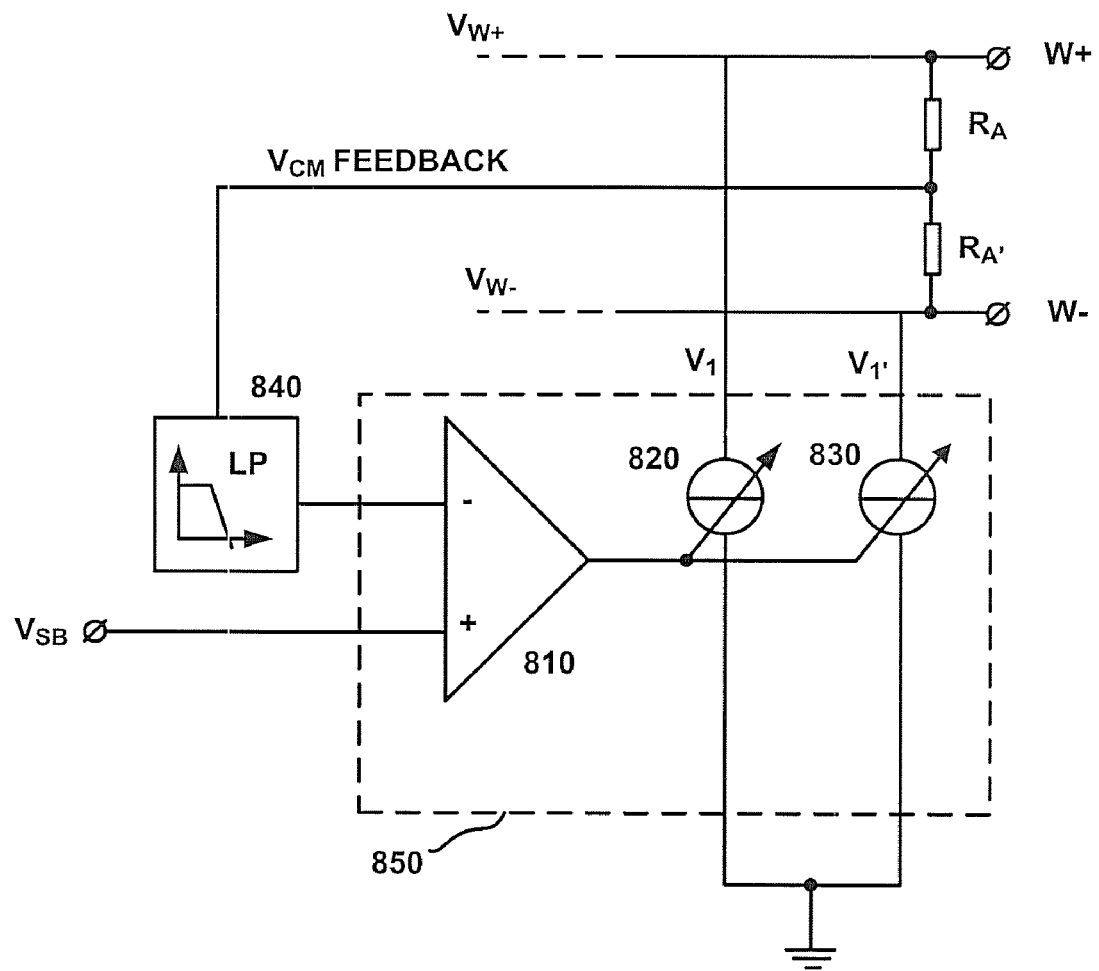
FIG. 8 is a block diagram of a common-mode control topology with current limit capability circuit, according to one embodiment.

FIG. 8 is a block diagram of a common-mode control topology with current limit capability circuit 800, according to one embodiment. In one embodiment, circuit 800 or a circuit performing its current limiting and/or voltage feedback control functions, is included in slider bias voltage generator 215. Circuit 800 shows how feedback from signal lines, such as the W+ and W− signal lines, can be sensed, such as at the output of write driver 710. The common-mode voltage on these signal lines is then controlled by the feedback circuit that has a bandwidth limiting low pass filter 840 in series with the feedback line which is used to supply an input voltage, $V_{CM}$ FEEDBACK, to voltage amplifier 810. $V_{CM}$ FEEDBACK is sensed from a center tap of two matched resistors $R_A$ and $R_{A'}$, which are coupled between the signal lines (W+ and W−). In one embodiment, $R_A$ and $R_{A'}$ are located on read-write IC 205. In one embodiment, $R_A$ and $R_{A'}$ have a resistance value in the range of approximately 1 kΩ to 10 kΩ. The other input to voltage amplifier 810 is the slider bias voltage, $V_{SB}$. The output of voltage amplifier 810 is coupled to twin adjustable current sources 820 and 830 which each have an output coupled to one of the signal lines (W+ and W−).

The DC common mode voltage on the signal lines is sensed through low pass filter 840. This allows voltage amplifier 810 to compare $V_{CM}$ FEEDBACK to $V_{SB}$ (generated in slider bias voltage generator 215) and output corrections as required to control the applied slider bias voltage $V_{SB}$ (e.g., maintain it at a desired or selected voltage) and also limit current. By utilizing low pass filter 840 to filter $V_{CM}$ FEEDBACK, high-frequency disturbances created by the write driver, 710, or contact asperities are not fedback to the controlled current sources 820 and 830 which are coupled to the signal lines (W+ and W−). Together, voltage amplifier 810 and adjustable current sources 820 and 830 comprise a transconductance amplifier 850.

Example Method of Biasing a Slider

FIG. 9 shows a flow diagram 900 of an example method of biasing a slider, according to one embodiment. Reference will be made to element shown in FIGS. 1-7 in the description of the method of flow diagram 900.

At 905 of flow diagram 900, in one embodiment, the method utilizes a predetermined programmable bias voltage value to control a bias voltage generation. The predetermined programmable bias voltage value is selected from a set voltage ranges (values) known to avoid slider-lube pickup or by other methods that accounts for disk voltage and lube variations. In one embodiment, once the bias voltage value is determined and/or selected, well-known circuit methods are utilized to transfer a digital setting to an analog voltage reference, which is then used for generation of the bias voltage (as described in block 910). It is appreciated that the range of values can be preselected, such as at a factory or laboratory. In one embodiment, the predetermined programmable bias voltage value itself is set or selected in a factory, laboratory, or while a disk drive is in operation.

At 910 of flow diagram 900, in one embodiment, the method generates a bias voltage for biasing a slider. In one embodiment, as described in block 905, this can comprise generating the slider bias voltage in accordance with a predetermined programmable voltage value, which dictates the voltage generated and maintained/controlled on the slider. As described in FIGS. 2-7, in various embodiments, generating a slider bias voltage can comprise utilizing a slider bias voltage generator 215 to generate the slider bias voltage, $V_{SB}$. In some embodiments, slider bias voltage generator 215 is a portion of read-write IC 205, which may be located on a flex cable, such as flex cable 110. In some embodiments, the generated slider bias voltage is generated and supplied as a common mode DC voltage for coupling to signal lines. In one embodiment, feedback is used to control a voltage level of the bias voltage which is generated and/or to control any voltage generated by the slider movement. An example of such feedback is illustrated and discussed in conjunction with FIG. 8. In one embodiment, as described in FIG. 8, low-pass signal filtering is also utilized to control and limit current on signal lines used to couple the slider bias voltage to a slider, such as slider 125.

At 920 of flow diagram 900, in one embodiment, the method integratedly couples the bias voltage to a conductive body of the slider via an existing signal path of the slider such that the slider is biased with the bias voltage and controlled/maintained at the bias voltage. With reference to FIGS. 2-7, in various embodiments, the existing signal path can comprise any of the write signal path, the read signal path, or the heater element control signal path. While the existing signal path is primarily used for conveying another signal (e.g., a write signal, read signal, or heater element control signal) to or from (and through) slider 125, at least sometimes the existing signal path conveys the bias voltage to the conductive body in an integral fashion along with another signal (such as the signal which the existing signal path primarily carries). In some embodiments, the existing signal and/or the bias voltage is applied through a common mode voltage on a pair of signal lines.

For example, in an embodiment, the bias voltage $V_{SB}$ can be coupled to slider 125 along with a write signal (at times such as when writing is taking place) via the existing write signal path on slider 125. Similarly, in an embodiment, the bias voltage $V_{SB}$ can be coupled to slider 125 via the existing read signal path on slider 125 simultaneously (at times such as when reading is taking place) with a read data signal which is being conveyed from slider 125 back to read-write IC 205. Likewise, in an embodiment, the bias voltage $V_{SB}$ can be conveyed along with a heater element control signal (when the heater element is being used) over the heater element control signal path on slider 125. Thus the slider bias voltage is conveyed in an integral fashion along with the primary signal of an existing signal path, and then coupled within slider 125 to the conductive slider body 225 such that slider body 225 is controlled to the bias voltage $V_{SB}$. In this manner $V_{SB}$ can control the voltage potential at which slider 125 is biased. Feedback and low-pass filtering can be used to maintain a predetermined voltage potential or biasing on slider 125 and to limit current. One example of feedback is described in conjunction with FIG. 8.

While an existing signal path or paths may be slightly modified to couple the slider bias voltage from the existing signal path to conductive slider body 225, a separate special purpose signal path for coupling the slider bias voltage from its generation source to and through slider 125 is not required. Additionally, while in some embodiments an existing signal path or paths may be slightly modified to attenuate RFI signals that are coupled to slider body 225, a separate special purpose signal path for coupling the slider bias voltage from its generation source to and through slider 125 is not required. Examples of these modifications, such as couplings to a slider body connection, couplings to ground, and inclusion of a capacitor and/or resistor(s) in the construction of slider 125 are illustrated in FIGS. 2 through 7.

In one embodiment, the method of flow diagram 900 further comprises providing a low frequency high impedance path to ground from the conductive body of the slider. This can comprise configuring or manufacturing a slider, such as slider 125, to include such a low-frequency high-impedance path to ground from conductive body 225. Resistor $R_2$, shown in FIGS. 2, 3, 5, and 7 illustrate examples of such a low-frequency high-impedance path to ground. Alternatively, a low-frequency high-impedance path may include a low-conductive epoxy connection from the slider body to the suspension, which is grounded as shown in FIGS. 4, 6A, and 6B, which utilize $R_3$ for the return path to ground.

In one embodiment, the method of flow diagram 900 further comprises providing a high frequency low impedance path to ground from the conductive body of the slider. This can comprise configuring or manufacturing a slider, such as slider 125, to include such a high frequency low impedance path to ground from conductive body 225. Such a path allows a selected range of alternating current (AC) RFI signals from the conductive body to be coupled to ground. This attenuates RFI signals on the slider body, protects the sensitive read element, and provides RFI interference immunity to the slider. $C_1$, illustrated in FIGS. 3, 5, and 7 as coupled between a slider body connection, SBC, and ground, illustrates an example of such a high frequency low impedance path between slider body 225 and ground. The value of $C_1$ is chosen such that the desired or selected range of RFI signals is attenuated by coupling them to ground. In one embodiment, this comprises selecting $C_1$ such that frequencies above approximately 100 Mhz are coupled to ground. Similarly, as illustrated in FIGS. 4, 6A, and 6B, $C_2$ as coupled between a slider body connection, SBC, and ground illustrates an example of such a high frequency low impedance path between slider body 225 and ground.

Example embodiments of the present invention are thus described. Although the embodiments of the present invention have been described in a language specific to structural features and/or methodological acts, it is to be understood that the embodiments of the present invention defined in the appended claims are not necessarily limited to the specific features or acts described above. Rather, the specific features and acts described above are disclosed as example forms of implementing the claims.

What is claimed is:

1. A method of biasing a slider comprising:
   generating a bias voltage for biasing a slider; and
   integratedly coupling said bias voltage to a conductive body via a heater element signal path of said slider such that said slider is biased with said bias voltage, wherein said heater element signal path is primarily used for conveying another signal to or from said slider but at least sometimes conveys said bias voltage to said conductive body in an integral fashion along with said another signal.

2. The method as recited in claim 1, further comprising:
   providing a low frequency high impedance path to ground from said conductive body; and
   providing a high frequency low impedance path to ground from said conductive body such that a selected range of alternating current (AC) Radio Frequency Interference (RFI) signals from said conductive body are coupled to ground to provide RFI immunity.

3. The method as recited in claim 1, further comprising:
   utilizing feedback to control a voltage level of said bias voltage on said slider.

4. The method as recited in claim 1, further comprising:
   generating said bias voltage in accordance with a predetermined programmable bias voltage value.

5. An integrated slider bias control system comprising:
   a slider bias voltage generator for generating a bias voltage; and
   an integrated slider bias voltage output configured to integratedly couple said bias voltage to a conductive body of a slider via a heater element signal path of said slider such that said slider is biased with said bias voltage, wherein said heater element signal path is primarily used for conveying another signal to or from said slider but at least sometimes conveys said bias voltage from said slider bias voltage generator to said conductive body in an integral fashion along with said another signal.

6. The integrated slider bias control system of claim 5, wherein said slider bias voltage generator comprises:
   a slider bias voltage feedback for controlling a voltage level of said bias voltage.

7. The integrated slider bias control system of claim 5, wherein said slider bias voltage generator comprises:
   a transconductance amplifier.

8. The integrated slider bias control system of claim 5, wherein said integrated slider bias voltage output comprises:
   a heater element output of a read-write integrated circuit (IC).

9. A hard disk drive comprising:
   a disk comprising a surface for magnetic storage of data;
   a slider having a head and a signal path to said head, said slider configured for moving across said surface for writing and reading of said data; and
   an example integrated slider bias control system comprising:
   a slider bias voltage generator for generating a bias voltage; and
   an integrated slider bias voltage output configured to integratedly couple said bias voltage to a conductive body as a common mode voltage coupled to said conductive body via a signal path of said slider such that said slider is biased with said common mode voltage, wherein said signal path is primarily used for conveying another signal to or from said slider but at least sometimes conveys said common mode voltage from said slider bias voltage generator to said conductive body in an integrated fashion along with said another signal.

10. The hard disk drive of claim 9, wherein said slider bias voltage generator comprises:
    a transconductance amplifier; and
    a slider bias voltage feedback for controlling a voltage level of said common mode voltage.

11. The hard disk drive of claim 9, wherein said integrated slider bias voltage output comprises:

a common mode output via read+ and read− pads of a read-write integrated circuit (IC).

12. The hard disk drive of claim 9, wherein said integrated slider bias voltage output comprises:
a common mode output via write+ and write− pads of a read-write integrated circuit (IC).

13. The hard disk drive of claim 9, wherein said slider comprises:
a low frequency high impedance path to ground from said conductive body.

14. The hard disk drive of claim 9, wherein said slider comprises:
a high frequency low impedance path to ground from said conductive body such that that a selected range of alternating current (AC) Radio Frequency Interference (RFI) signals from said conductive body are coupled to ground to provide RFI immunity.

15. The hard disk drive of claim 9, wherein said signal path comprises two branches and said slider comprises:
matched resistive elements coupled between a slider body connection and each branch of said signal path.

* * * * *